United States Patent
Wada

(10) Patent No.: US 10,832,203 B2
(45) Date of Patent: Nov. 10, 2020

(54) CONTROL DEVICE, READING DEVICE, TASK ASSISTANCE SYSTEM, NON-TRANSITORY COMPUTER READABLE MEDIUM, AND CONTROL METHOD

(71) Applicant: FUJI XEROX CO., LTD., Tokyo (JP)

(72) Inventor: Masanori Wada, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 1027 days.

(21) Appl. No.: 14/992,141

(22) Filed: Jan. 11, 2016

(65) Prior Publication Data
US 2017/0053233 A1    Feb. 23, 2017

(30) Foreign Application Priority Data

Aug. 21, 2015    (JP) .................. 2015-163543

(51) Int. Cl.
*G06Q 10/08*    (2012.01)

(52) U.S. Cl.
CPC .............. *G06Q 10/0833* (2013.01)

(58) Field of Classification Search
CPC .................. G06Q 10/0833
See application file for complete search history.

(56) References Cited

U.S. PATENT DOCUMENTS

| | | | | |
|---|---|---|---|---|
| 6,687,684 B1* | 2/2004 | Whitehouse | ..... | G07B 17/00435 705/408 |
| 6,762,857 B1* | 7/2004 | Salgado | ............. | H04N 1/00915 358/1.15 |
| 2002/0016803 A1* | 2/2002 | Ryan | ...................... | G06Q 10/06 715/255 |
| 2004/0066527 A1* | 4/2004 | Kloosterman | ........ | G06F 3/1207 358/1.15 |
| 2009/0147988 A1* | 6/2009 | Jones | ..................... | G06K 9/036 382/100 |
| 2012/0246565 A1* | 9/2012 | Kumamoto | ............... | G06F 8/38 715/273 |
| 2014/0129021 A1* | 5/2014 | Boynton | ............ | H04N 1/00827 700/118 |
| 2014/0250163 A1* | 9/2014 | Schneider | ............... | H04L 51/34 709/202 |

FOREIGN PATENT DOCUMENTS

| | | |
|---|---|---|
| JP | 10-254537 A | 9/1998 |
| JP | 2000-301813 A | 10/2000 |

OTHER PUBLICATIONS

Wendy E. Mackay, The missing link: integrating paper and electronic documents, 2003, p. 3-5 (Year: 2003).*

* cited by examiner

*Primary Examiner* — George Chen
*Assistant Examiner* — Ibrahim N El-Bathy
(74) *Attorney, Agent, or Firm* — Sughrue Mion, PLLC

(57) ABSTRACT

A control device includes an output controller that controls output of contents of a task for collecting multiple predetermined articles and output of a missing one of the articles based on a result of a comparison between first identification information, which is article identification information about each of the multiple articles, and second identification information, which is the article identification information read from any one of the multiple articles.

20 Claims, 16 Drawing Sheets

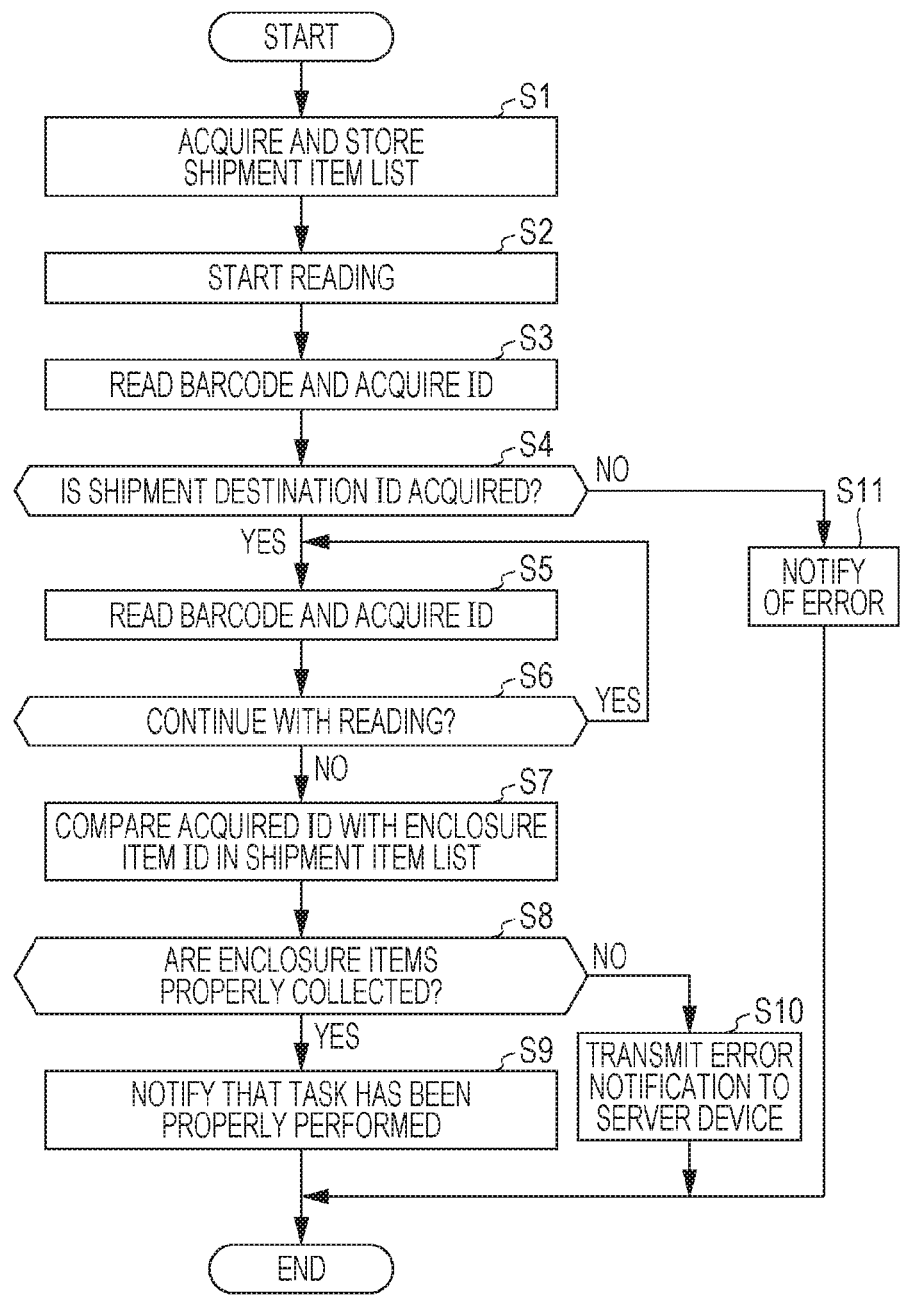

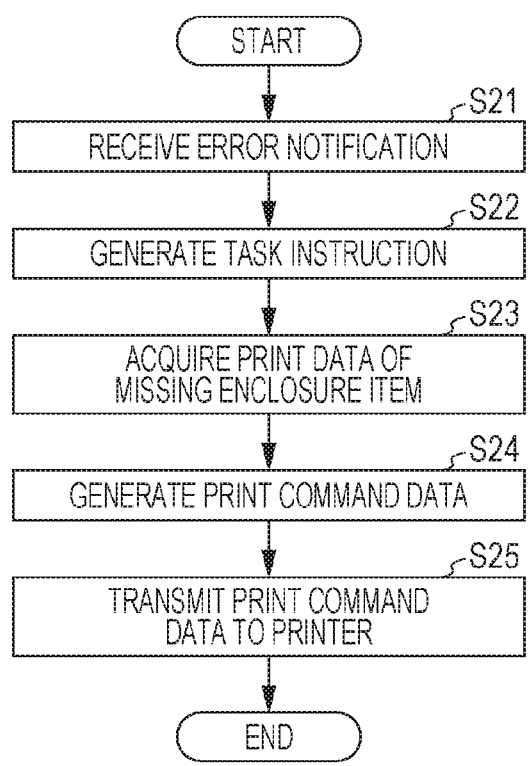

US 10,832,203 B2

CONTROL DEVICE, READING DEVICE, TASK ASSISTANCE SYSTEM, NON-TRANSITORY COMPUTER READABLE MEDIUM, AND CONTROL METHOD

CROSS-REFERENCE TO RELATED APPLICATIONS

This application is based on and claims priority under 35 USC 119 from Japanese Patent Application No. 2015-163543 filed Aug. 21, 2015.

BACKGROUND

Technical Field

The present invention relates to control devices, reading devices, task assistance systems, non-transitory computer readable media, and control methods.

SUMMARY

According to an aspect of the invention, there is provided a control device including an output controller that controls output of contents of a task for collecting multiple predetermined articles and output of a missing one of the articles based on a result of a comparison between first identification information, which is article identification information about each of the multiple articles, and second identification information, which is the article identification information read from any one of the multiple articles.

BRIEF DESCRIPTION OF THE DRAWINGS

Exemplary embodiments of the present invention will be described in detail based on the following figures, wherein:

FIG. 7 is a flowchart illustrating a process performed by the reading device according to the first exemplary embodiment;

FIG. 8 is a flowchart illustrating a process performed by the server device according to the first exemplary embodiment;

DETAILED DESCRIPTION

First Exemplary Embodiment

Figure 1:
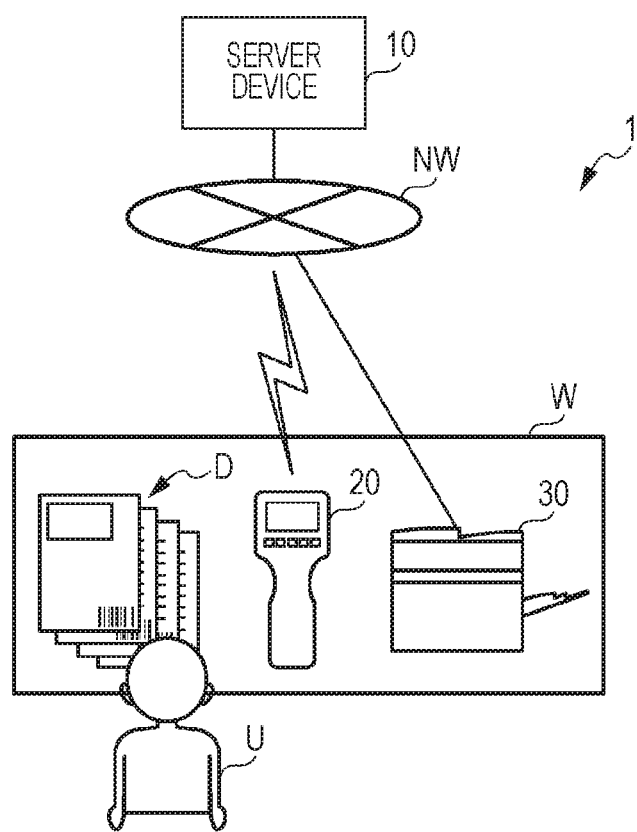
FIG. 1 illustrates the overall configuration of a task assistance system according to a first exemplary embodiment of the present invention.

FIG. 1 illustrates the overall configuration of a task assistance system 1 according to a first exemplary embodiment of the present invention. The task assistance system 1 assists in a shipment task manually performed by an operator U. The shipment task involves collecting multiple shipment items D set in accordance with each of multiple shipment destinations and performing enclosing and sealing processes thereon. The shipment items D are an example of articles according to an exemplary embodiment of the present invention. In the first exemplary embodiment, the shipment items D are documents. Examples of a document include a document containing information unique to each shipment destination (such as a cover letter) and a document containing information common to multiple shipment destinations (such as an advertisement).

As shown in FIG. 1, the task assistance system 1 includes a server device 10, a reading device 20, and a printer 30. The server device 10, the reading device 20, and the printer 30 are connected to a communication line NW in a wired or wireless manner. The communication line NW is, for example, a network, such as a local area network (LAN), but is not particularly limited to a specific type of communication line. The reading device 20 and the printer 30 are disposed on a worktable W used by the operator U.

Although a single reading device 20 and a single printer 30 are shown in FIG. 1, there are multiple operators and multiple reading devices 20 and printers 30 in actuality.

The server device 10 manages data related to the shipment task. The reading device 20 is of a handheld type used by being manually held by the operator U and has a barcode reading function. The printer 30 is an example of an image forming unit or an output unit according to an exemplary embodiment of the present invention and prints (i.e., forms) an image onto a medium, such as paper.

Figures 2, 3:
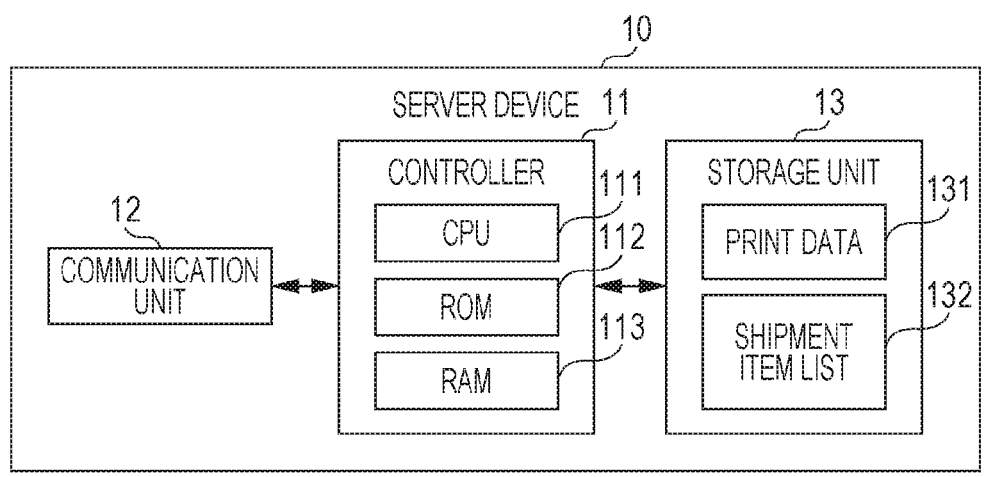
FIG. 2 illustrates a hardware configuration of a server device according to the first exemplary embodiment.
FIG. 3 illustrates the configuration of a shipment item list according to the first exemplary embodiment.

FIG. 2 illustrates a hardware configuration of the server device 10. As shown in FIG. 2, the server device 10 includes a controller 11, a communication unit 12, and a storage unit 13. The controller 11 includes a processor that contains a central processing unit (CPU) 111 as a computing unit, a read-only memory (ROM) 112, and a random access memory (RAM) 113 as a memory. The controller 11 is an example of a control device according to an exemplary embodiment of the present invention. The CPU 111 controls each unit of the server device 10 by loading a program stored in the ROM 112 or the storage unit 13 into the RAM 113 and executing the program.

The communication unit 12 includes, for example, a modem and connects to the communication line NW so as to communicate with the reading device 20 and the printer 30. The storage unit 13 includes, for example, a hard disk device and stores print data 131 and a shipment item list 132 in addition to the program to be executed by the CPU 111. The print data 131 includes print data for printing the shipment items D handled in the task assistance system 1. The shipment item list 132 is a list that designates shipment items in correspondence with each of multiple shipment destinations.

Figure 4:
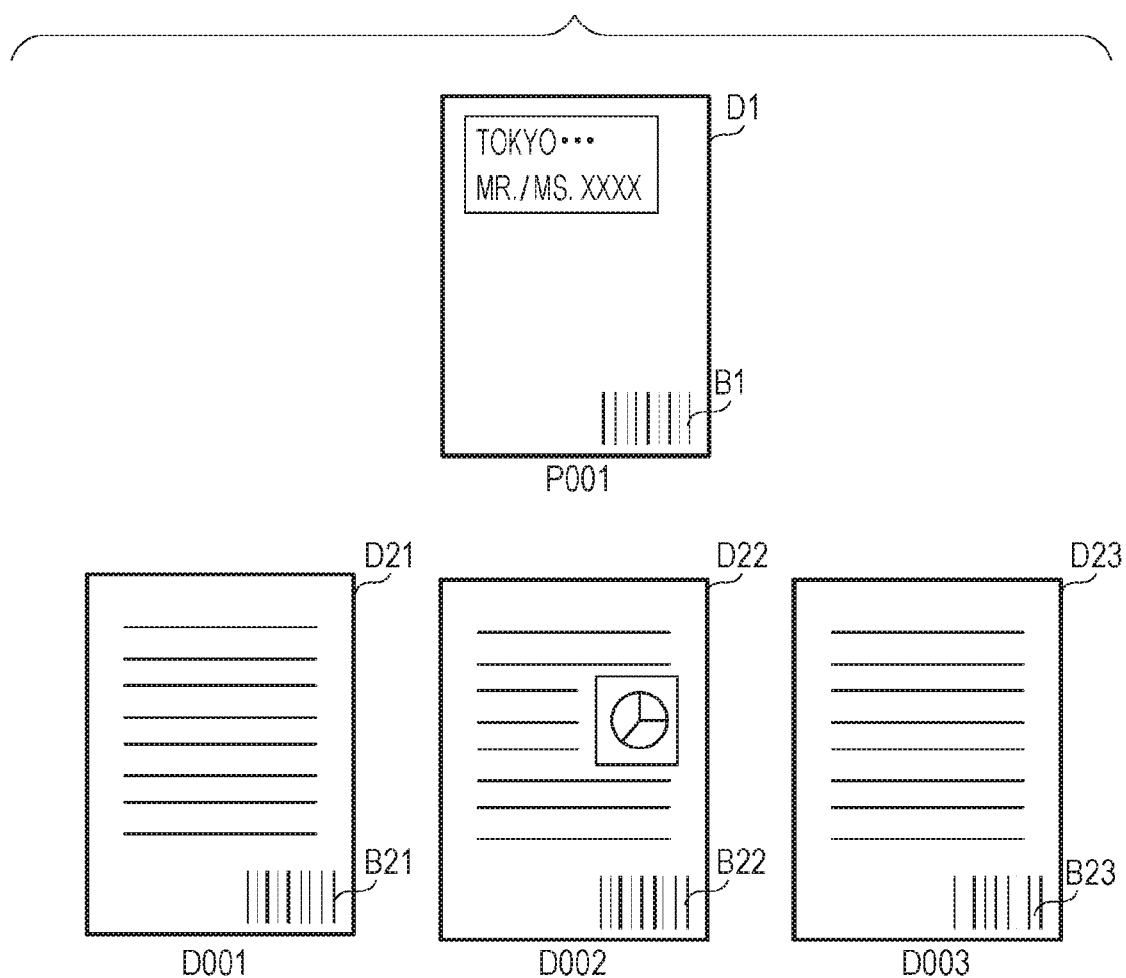
FIG. 4 illustrates examples of shipment items according to the first exemplary embodiment.

FIG. 3 illustrates the configuration of the shipment item list 132. FIG. 4 illustrates examples of shipment items D.

As shown in FIG. 3, the shipment item list 132 is a list in which a shipment destination ID and enclosure item IDs are registered in correspondence with each other for each of the multiple shipment destinations. A shipment destination ID is shipment-destination identification information. In the first exemplary embodiment, each shipment destination ID is stored in correspondence with print data of a cover letter having shipment-destination information (such as an address) written thereon. An enclosure item ID is shipment-item identification information. Each enclosure item ID is stored in correspondence with print data of a shipment item (which will be referred to as "enclosure item" hereinafter) to be shipped together with a cover letter. The registered order of multiple enclosure item IDs corresponding to each shipment destination ID in the shipment item list 132 indicates the order in which the enclosure items are to be arranged (i.e., to be stacked).

A shipment destination ID and an enclosure item ID are an example of first identification information according to an exemplary embodiment of the present invention.

For example, in the first row of the shipment item list 132 shown in FIG. 3, it is designated that a cover letter D1, an enclosure item D21 indicated by an enclosure item ID "D001", an enclosure item D22 indicated by an enclosure item ID "D002", and an enclosure item D23 indicated by an enclosure item ID "D003" shown in FIG. 4, which correspond to a shipment destination indicated by a shipment destination ID "P001", are to be arranged in the following order: the cover letter D1, the enclosure item D21, the enclosure item D22, and the enclosure item D23. The cover letter D1 has printed thereon, in addition to the shipment-destination information, a barcode B1 having the shipment destination ID "P001" encoded therein. The enclosure item D21 has printed thereon a barcode B21 having the enclosure item ID "D001" encoded therein. The enclosure item D22 has printed thereon a barcode B22 having the enclosure item ID "D002" encoded therein. The enclosure item D23 has printed thereon a barcode B23 having the enclosure item ID "D003" encoded therein.

Figure 5:
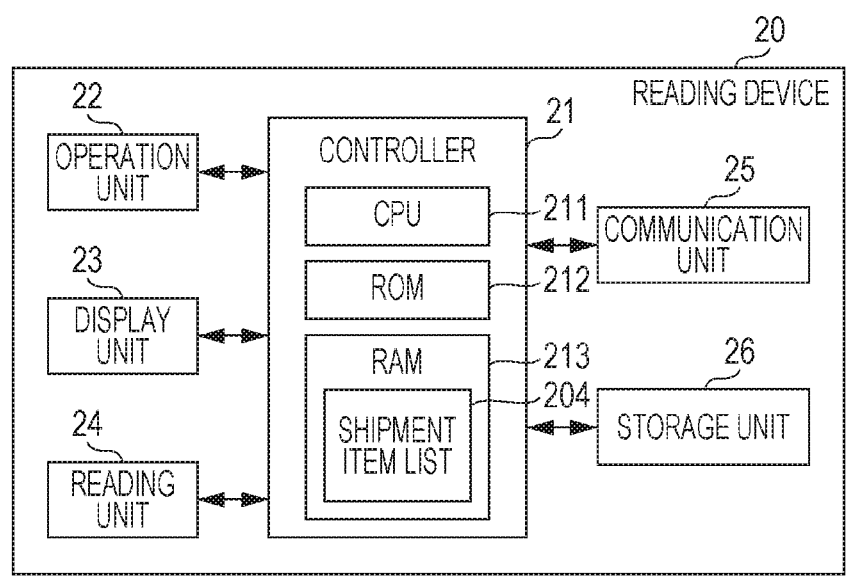
FIG. 5 illustrates a hardware configuration of a reading device according to the first exemplary embodiment.

FIG. 5 illustrates a hardware configuration of the reading device 20. As shown in FIG. 5, the reading device 20 includes a controller 21, an operation unit 22, a display unit 23, a reading unit 24, a communication unit 25, and a storage unit 26.

The controller 21 includes a processor that contains a CPU 211 as a computing unit, a ROM 212, and a RAM 213 as a memory. The CPU 211 controls each unit of the reading device 20 by loading a program stored in the ROM 212 or the storage unit 26 into the RAM 213 and executing the program. The CPU 211 causes the RAM 213 to store a shipment item list 204 therein and performs a process by referring to the shipment item list 204. The shipment item list 204 is, for example, a copy of the shipment item list 132 (see FIG. 3).

The operation unit 22 includes, for example, multiple operators and receives an operation performed by the operator U. The display unit 23 includes, for example, a liquid crystal display and displays an image for notifying a user of information. The reading unit 24 is an example of a reading unit according to an exemplary embodiment of the present invention and includes, for example, a charge-coupled device (CCD) image sensor as an imaging element. The CPU 211 recognizes a barcode contained in image data acquired by the reading unit 24 so as to obtain information (referred to as "ID" hereinafter) unique to the barcode. The communication unit 25 includes, for example, a wireless communication circuit and an antenna and connects to the communication line NW so as to communicate with the server device 10. The storage unit 26 includes, for example, a semiconductor memory and stores the program to be executed by the CPU 211.

Figure 6:
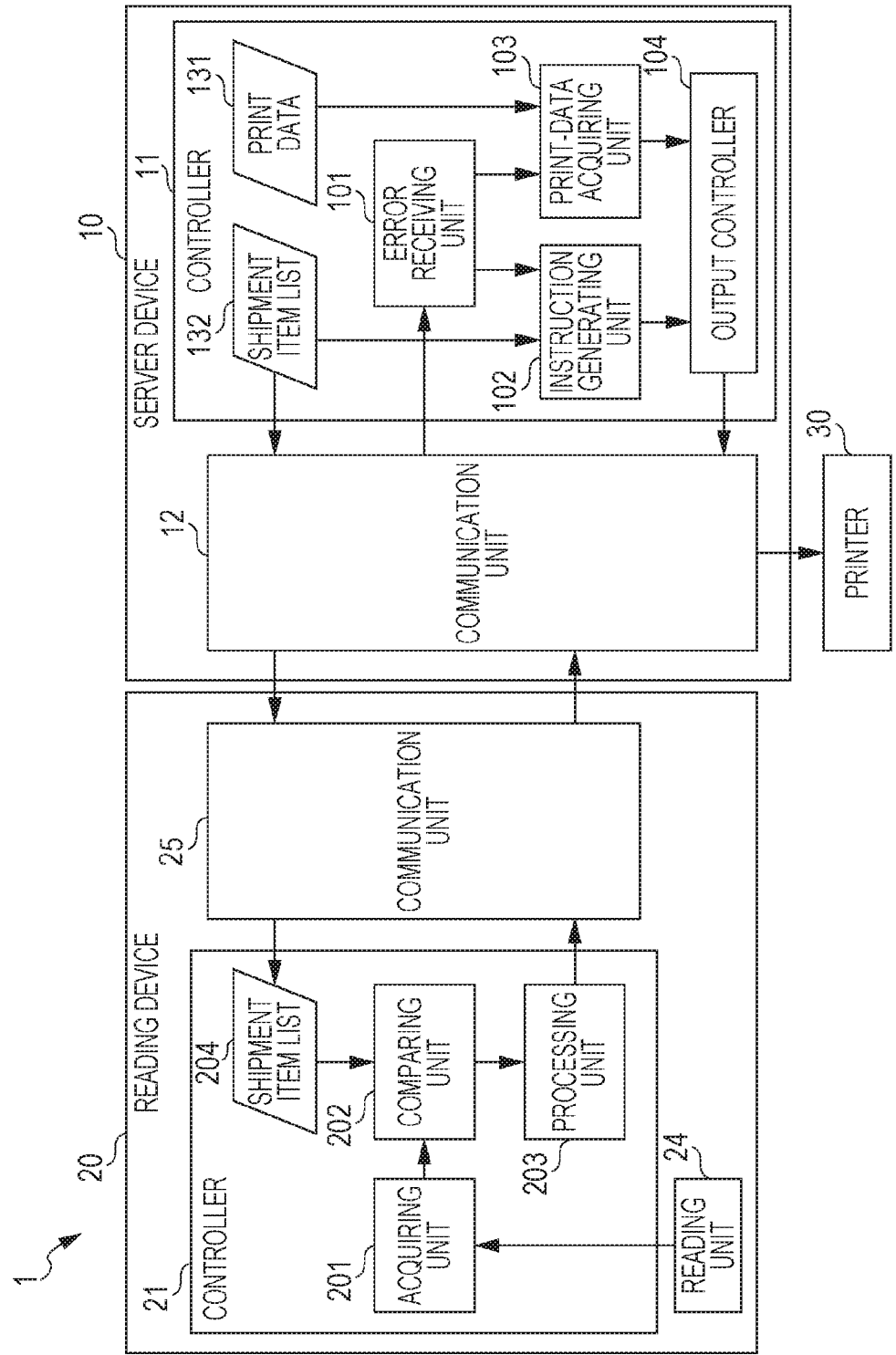
FIG. 6 illustrates a functional configuration of the task assistance system according to the first exemplary embodiment.

FIG. 6 illustrates a functional configuration of the task assistance system 1. As shown in FIG. 6, the controller 21 of the reading device 20 realizes functions corresponding to an acquiring unit 201, a comparing unit 202, and a processing unit 203. The functions of the controller 21 are realized by, for example, an application program installed in the reading device 20.

The acquiring unit 201 acquires an ID of any one of the shipment items D based on a barcode read by the reading unit 24 from the shipment item D. The ID acquired from the barcode is an example of second identification information according to an exemplary embodiment of the present invention.

The comparing unit 202 compares the ID acquired by the acquiring unit 201 with the shipment destination IDs or the enclosure item IDs registered in the shipment item list 204. When a certain shipment destination ID is acquired, the comparing unit 202 uses the enclosure item ID or IDs corresponding to this shipment destination ID in the shipment item list 204 for the comparison.

The processing unit 203 executes a process based on the comparison result obtained by the comparing unit 202. For example, the processing unit 203 determines whether the shipment items have been properly collected based on the comparison result. If the shipment items have not been properly collected, the processing unit 203 transmits an error notification to the server device 10 via the communication unit 25.

As shown in FIG. 6, the controller 11 of the server device 10 realizes functions corresponding to an error receiving unit 101, an instruction generating unit 102, a print-data acquiring unit 103, and an output controller 104.

The error receiving unit 101 receives the error notification transmitted from the processing unit 203 via the communication unit 12.

The instruction generating unit 102 generates a task instruction based on the print data 131 and the shipment item list 132 if the error notification is received by the error receiving unit 101. The task instruction is a document having written thereon the contents of a task to be performed for collecting the enclosure items.

The print-data acquiring unit 103 acquires print data of a missing enclosure item from the print data 131 if the error notification is received by the error receiving unit 101.

The output controller 104 generates print command data for outputting, by printing, the task instruction generated by the instruction generating unit 102 and the enclosure item expressed by the print data acquired by the print-data acquiring unit 103, and transmits the print command data to the printer 30 via the communication unit 12.

FIG. 7 is a flowchart illustrating a process performed by the reading device 20.

First, in step S1, the CPU 211 of the reading device 20 makes an inquiry to the server device 10 via the communication unit 25 and causes the RAM 213 to store the shipment item list 204. For example, the CPU 211 causes the RAM 213 to store the shipment item list 204 at the start of a shipment task. Although the shipment item list 204 is identical to the shipment item list 132 shown in FIG. 3, the shipment item list 204 may only contain data of a portion of the shipment item list 132 (e.g., a portion corresponding to the shipment task that the operator U is in charge of).

Subsequently, in step S2, the CPU 211 causes the reading unit 24 to start reading a barcode. The operator U makes the reading unit 24 read the barcode by bringing the reading unit 24 to the barcode. In step S3, the CPU 211 reads the barcode and acquires an ID by decoding it from the barcode.

Then, in step S4, the CPU 211 determines whether a shipment destination ID has been acquired in step S3. The CPU 211 performs the determination process in step S4 based on whether the acquired ID matches any one of the shipment destination IDs registered in the shipment item list 204. It is assumed that the CPU 211 has acquired the shipment destination ID "P001" from the barcode B1 of the cover sheet D1 shown in FIG. 4. In this case, the CPU 211 determines that the shipment destination indicated by the shipment destination ID "P001" has been designated and thus obtains a determination result "YES" in step S4. The CPU 211 may notify the operator U that a shipment destination ID has been acquired by displaying a message on the display unit 23 or by outputting sound.

If a determination result "YES" is obtained in step S4, the CPU 211 causes the reading unit 24 to continue reading a barcode. When a barcode is read by the reading unit 24, the CPU 211 acquires an ID from this barcode in step S5. The CPU 211 causes the RAM 213 to store the acquired ID. After making the reading unit 24 read the barcode B1 of the cover sheet D1, the operator U makes the reading unit 24 read a barcode of an enclosure item to be enclosed together with the cover sheet D1. Therefore, the ID acquired by the CPU 211 in step S5 is basically an enclosure item ID.

Subsequently, in step S6, the CPU 211 determines whether to continue with the barcode reading process. For example, the CPU 211 continues with the reading process until an operation command for terminating the reading process is received via the operation unit 22. In this case, the CPU 211 obtains a determination result "YES" in step S6 and returns to step S5. In other words, every time a barcode is read, the CPU 211 acquires an ID from the barcode and causes the RAM 213 to store (accumulate) this ID in the acquired order. In this case, it is assumed that the operator U has arranged the enclosure items D21, D22, and D23 shown in FIG. 4 in this order and has caused the reading unit 24 to read the barcodes B21, B22, and B23 in this order.

When an operation command for terminating the reading process is received, the CPU 211 determines that the barcode reading process is to be terminated (NO in step S6). The operator U inputs this operation command when the operator U determines that all of the enclosure items to be shipped to a single shipment destination have been collected.

Then, in step S7, the CPU 211 compares the IDs stored in the RAM 213 with the enclosure item IDs registered in the shipment item list 204. The CPU 211 uses the enclosure item IDs corresponding to the shipment destination ID acquired in step S2 in the shipment item list 204 for the comparison. In this case, the CPU 211 compares the acquired IDs with the enclosure item IDs "D001", "D002", and "D003" corresponding to the shipment destination ID "P001".

Subsequently, in step S8, the CPU 211 determines whether the enclosure items have been properly collected based on the comparison result obtained in step S7. If the enclosure item IDs registered in the shipment item list 204 in correspondence with the shipment destination ID acquired in step S3 are acquired in the registered order in the shipment item list 204, the CPU 211 determines that the enclosure items have been properly collected. Otherwise, the CPU 211 determines that the enclosure items have not been properly collected. Therefore, the CPU 211 obtains a determination result "NO" in step S8 if any of the following conditions I to III is satisfied.

Condition I: There is an enclosure item ID not acquired in step S5 from among the enclosure item IDs registered in the shipment item list 204.

Condition II: At least one of the IDs acquired in step S5 does not match the enclosure item IDs registered in the shipment item list 204.

Condition III: The order in which the enclosure item IDs are acquired in step S5 is different from the order in which the enclosure item IDs are registered in the shipment item list 204.

If condition I is satisfied, there is an enclosure item not collected by the operator U. In other words, there is a missing enclosure item. If condition II is satisfied, there is a wrong enclosure item mistakenly collected by the operator U. If condition III is satisfied, the order in which the enclosure items are arranged by the operator U is incorrect.

If a determination result "YES" is obtained in step S8, the task for collecting the enclosure items has been properly performed. In this case, in step S9, the CPU 211 notifies the operator U that the task has been properly performed by displaying a message on the display unit 23 or by outputting sound.

In contrast, if a determination result "NO" is obtained in step S8, the task for collecting the enclosure items has not been properly performed. In this case, in step S10, the CPU 211 transmits an error notification to the server device 10 via the communication unit 25. The CPU 211 may notify the operator U that the task has not been properly performed by displaying a message on the display unit 23 or by outputting sound. The error notification contains, for example, the IDs acquired in steps S3 and S5 and the enclosure item ID of the missing enclosure item or the wrong enclosure item.

In a case where a determination result "NO" is obtained in step S4, that is, in a case where a shipment destination ID for designating a shipment destination is not acquired, the CPU 211 notifies the operator U of the error by displaying a message on the display unit 23 or by outputting sound in step S11. In this case, the operator U makes the reading device 20 read the barcode B1 of the cover sheet D1. As a result of this reading process, the CPU 211 obtains a determination result "YES" in step S4.

The process executed by the reading device 20 has been described above. Every time a shipment task related to a certain shipment destination is to be started, the operator U performs the shipment task by making the reading device 20 read a shipment destination ID.

FIG. 8 is a flowchart illustrating a process performed by the server device 10.

In step S21, the CPU 111 of the server device 10 receives an error notification from the reading device 20 via the communication unit 12. Then, in step S22, the CPU 111 generates a task instruction based on this error notification. Based on the error notification and the shipment item list 132, the CPU 111 specifies a missing enclosure item or a mistakenly collected enclosure item and specifies the contents of a task for properly collecting the enclosure items. Moreover, based on the print data 131, the CPU 111 specifies the contents (i.e., an image) of the missing enclosure item or the mistakenly collected enclosure item.

Subsequently, if there is a missing enclosure item based on the error notification, the CPU 111 acquires print data for printing this enclosure item in step S23. Then, in step S24, the CPU 111 generates print command data for outputting, by printing, the task instruction generated in step S22 and the enclosure item expressed by the print data acquired in step S23. In step S25, the CPU 111 transmits the generated print command data to the printer 30 via the communication unit 12.

The printer 30 outputs a task instruction if there is a missing enclosure item, if there is an enclosure item that has to be removed, if there is an enclosure item that has to be replaced, or if there are enclosure items that have to be rearranged, that is, if an error notification is received. Furthermore, if there is a missing enclosure item or if there is an enclosure item that has to be replaced, the printer 30 outputs the enclosure item. If there is an enclosure item that has to be removed or if there are enclosure items that have to be rearranged, the printer 30 does not output the enclosure item.

Next, printed matter output by the printer 30 will be described in accordance with various factors due to which the enclosure-item collecting task is not properly performed.

Figure 9A:
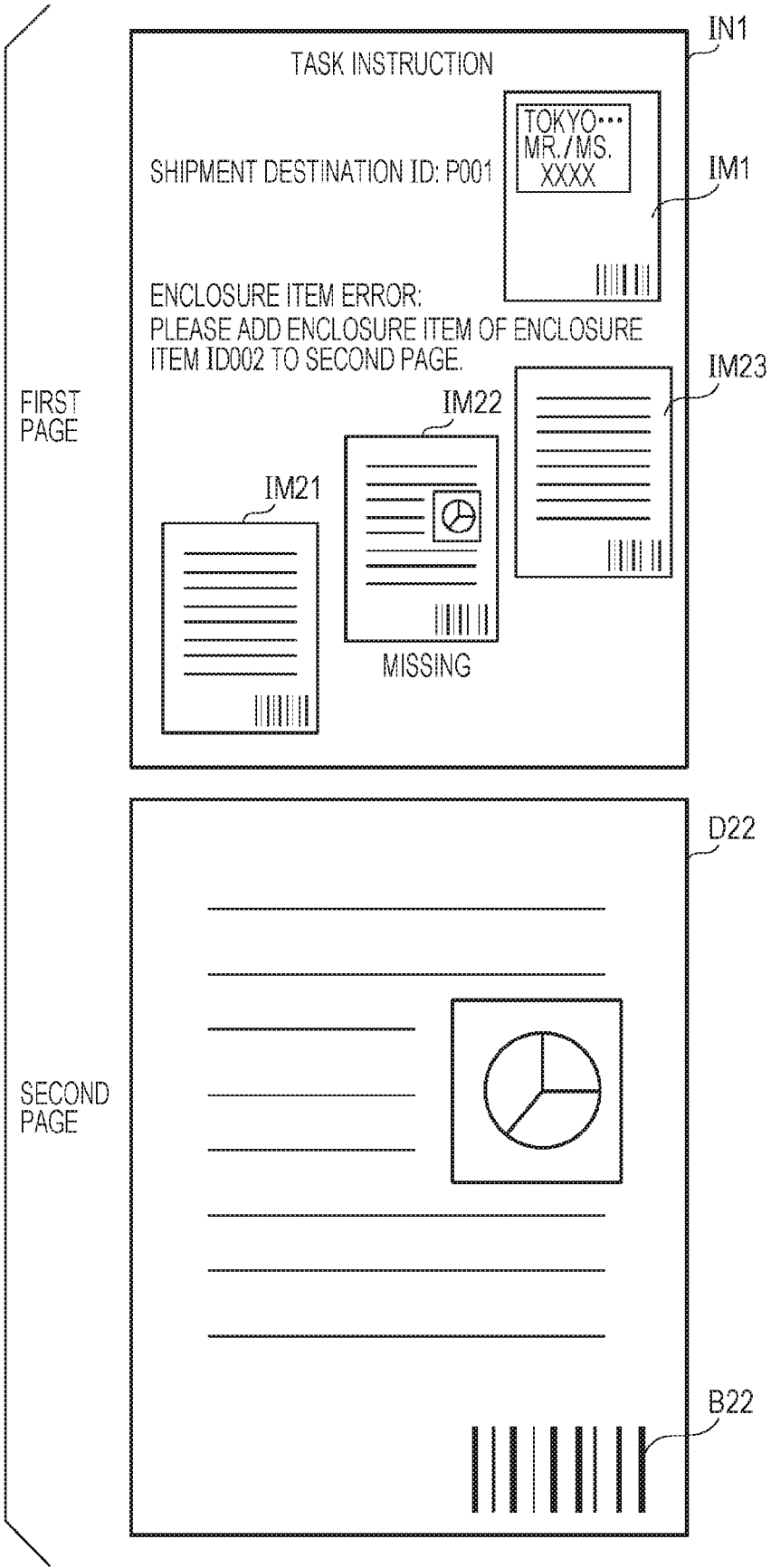
FIG. 9A illustrates printed matter in a case where there is a missing enclosure item, in accordance with the first exemplary embodiment.

FIG. 9A illustrates printed matter in a case where there is a missing enclosure item. In the example in FIG. 9A, the enclosure items D21 and D23 have been collected but the enclosure item D22 has not been collected. In this case, the server device 10 controls the printer 30 so as to cause the printer 30 to print a task instruction IN1 on the first page and the enclosure item D22 on the second page. The task instruction IN1 has printed thereon the shipment destination ID "P001" and a thumbnail image IM1, which is a reduced image of the cover sheet D1. The task instruction IN1 also has printed thereon a message that reads "enclosure item error: please add enclosure item of enclosure item ID002 to second page", thumbnail images IM21, IM22, and IM23 of the enclosure items D21, D22, and D23, and a message that reads "missing" associated with the thumbnail image IM22. In other words, the task instruction IN1 is related to the current shipment task and indicates that the enclosure item D22 should be added to the second page. With regard to the missing enclosure item D22, the operator U may enclose the printed matter output from the printer 30.

Figure 9B:
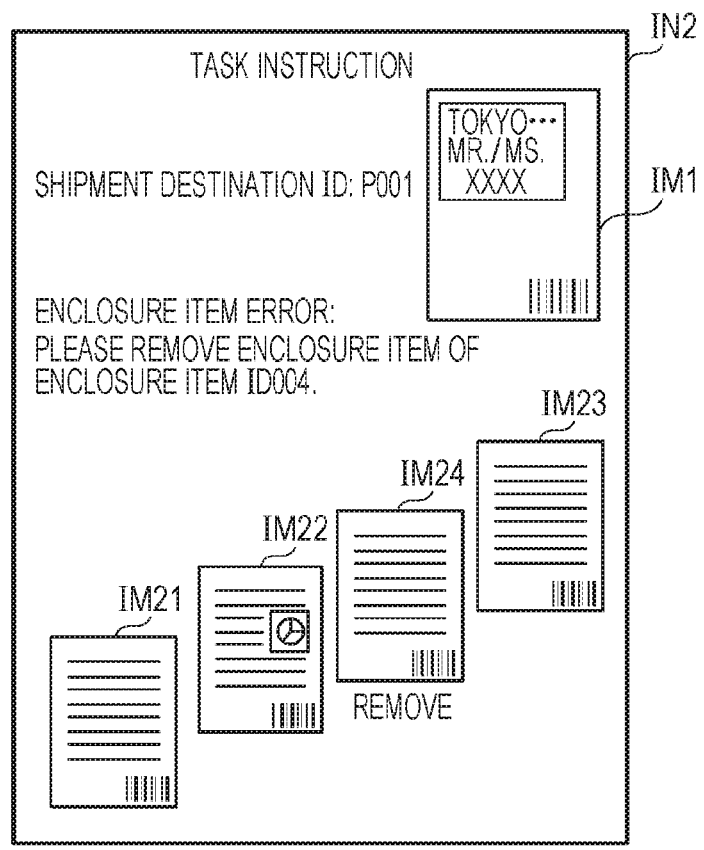
FIG. 9B illustrates printed matter in a case where there is an enclosure item that has to be removed, in accordance with the first exemplary embodiment.

FIG. 9B illustrates printed matter in a case where there is an enclosure item that has to be removed. In the example in FIG. 9B, the enclosure items D21 to D23 have been collected but there is an extra enclosure item D24 that has been mistakenly collected. In this case, the server device 10 controls the printer 30 so as to cause the printer 30 to print a task instruction IN2. The task instruction IN2 has printed thereon the shipment destination ID "P001" and the thumbnail image IM1. The task instruction IN2 also has printed thereon a message that reads "enclosure item error: please remove enclosure item of enclosure item ID004", the thumbnail images IM21, IM22, and IM23, a thumbnail image IM24 of the enclosure item D24, and a message that reads "remove" associated with the thumbnail image IM24. In other words, the task instruction IN2 is related to the current shipment task and indicates that the enclosure item D24 should be removed.

Figure 9C:
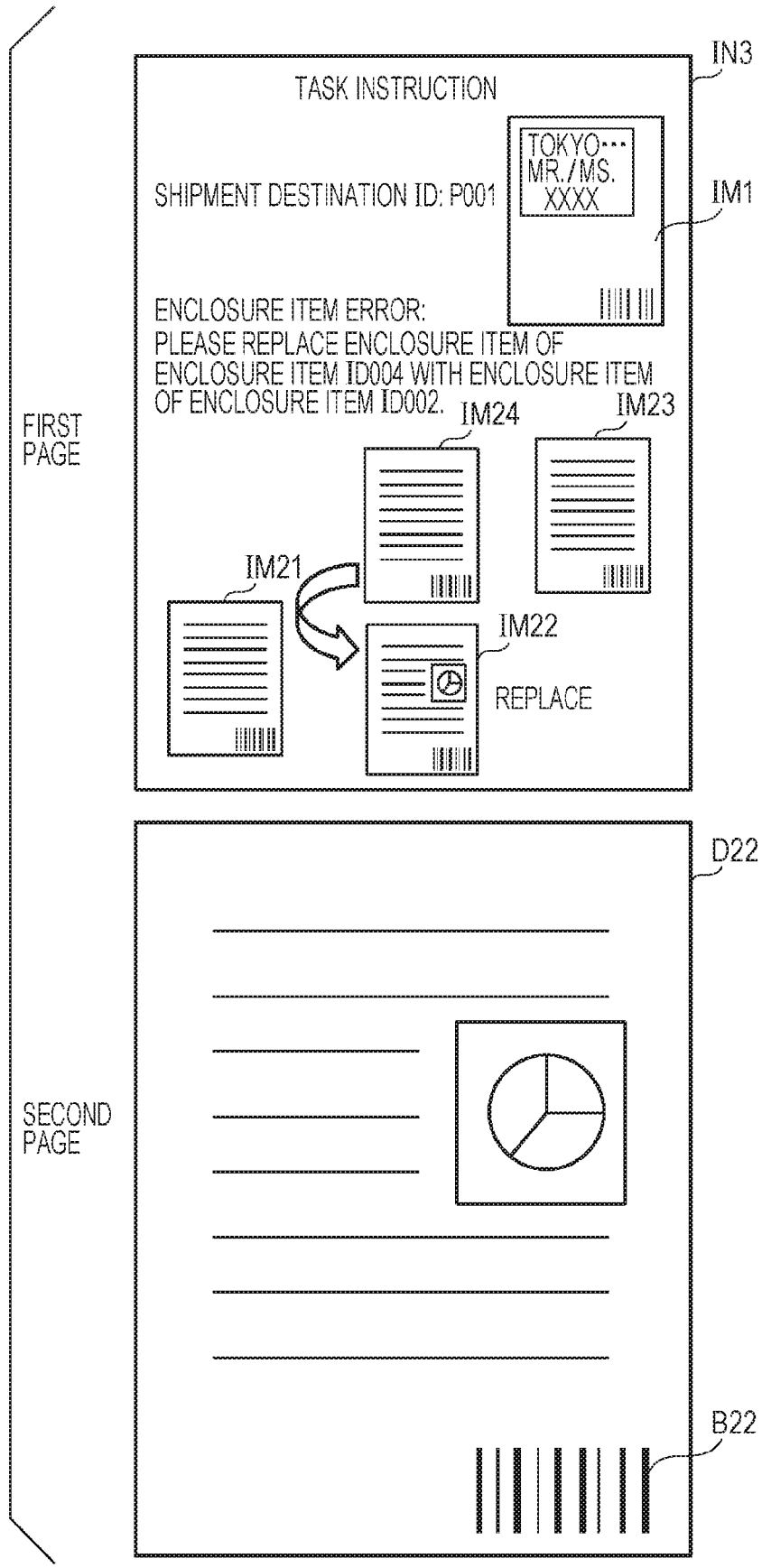
FIG. 9C illustrates printed matter in a case where there is an enclosure item that has to be replaced, in accordance with the first exemplary embodiment.

FIG. 9C illustrates printed matter in a case where there is an enclosure item that has to be replaced. In the example in FIG. 9C, the enclosure item D24 has been mistakenly collected in place of the enclosure item D22. In this case, the server device 10 controls the printer 30 so as to cause the printer 30 to print a task instruction IN3 on the first page and the enclosure item D22 on the second page. The task instruction IN3 has printed thereon the shipment destination ID "P001" and the thumbnail image IM1. The task instruction IN3 also has printed thereon a message that reads "enclosure item error: please replace enclosure item of enclosure item ID004 with enclosure item of enclosure item ID002", the thumbnail images IM21, IM22, IM23, and IM24, and a message that reads "replace" associated with the thumbnail image IM22. In other words, the task instruction IN3 is related to the current shipment task and indicates that the enclosure item D24 should be replaced with the enclosure item D22. With regard to the missing enclosure item D22, the operator U may enclose the printed matter output from the printer 30.

Figure 9D:
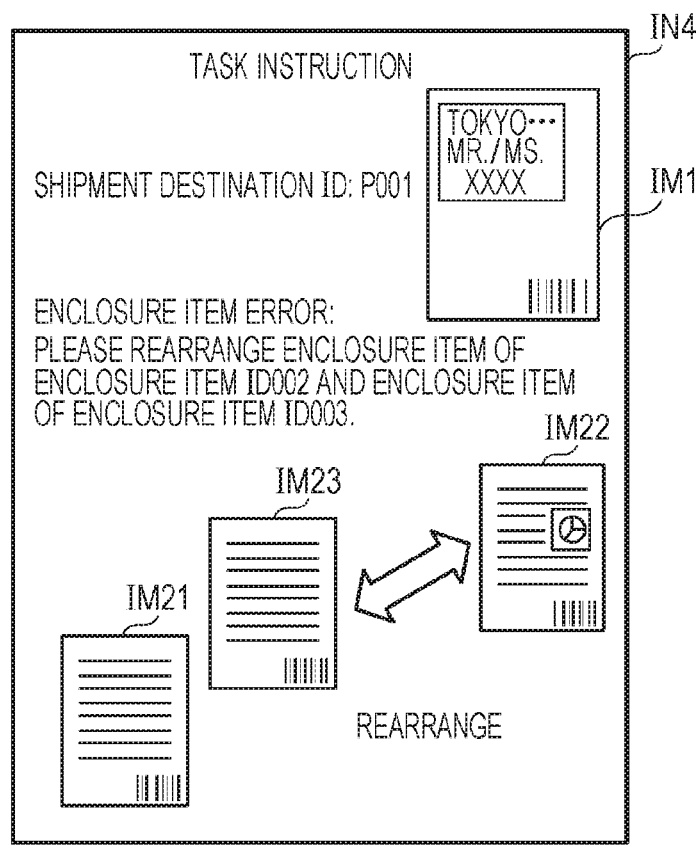
FIG. 9D illustrates printed matter in a case where there are enclosure items that have to be rearranged, in accordance with the first exemplary embodiment.

FIG. 9D illustrates printed matter in a case where there are enclosure items that have to be rearranged. In the example in FIG. 9D, the enclosure items D21 to D23 have been collected but are arranged in the wrong order. In this case, the server device 10 causes the printer 30 to print a task instruction IN4. The task instruction IN4 has printed thereon the shipment destination ID "P001" and the thumbnail image IM1. The task instruction IN4 also has printed thereon a message that reads "enclosure item error: please rearrange enclosure item of enclosure item ID002 and enclosure item of enclosure item ID003", the thumbnail images IM21, IM22, and IM23, and a message that reads "rearrange" associated with the thumbnail images IM22 and IM23. In other words, the task instruction IN4 is related to the current shipment task and indicates that the enclosure item D22 and the enclosure item D23 should be rearranged.

In the task assistance system 1 described above, if the operator U makes a mistake in the task for collecting multiple shipment items designated in the shipment item list, a task instruction that describes the contents of the shipment-item collecting task and a missing enclosure item are output by printing. Therefore, the operator U may quickly ascertain what should be performed for properly collecting the shipment items by looking at the contents of the task instruction. Furthermore, since thumbnail images are printed on the task instruction, the operator U may readily visually ascertain the contents of the task that should be performed. Because the missing enclosure item is output from the printer 30, the operator U does not have to go collect that shipment item from a storage location.

Moreover, the task assistance system 1 determines whether desired shipment items have been collected for each shipment destination. Therefore, according to the task assistance system 1, an erroneous task by the operator U or the load on the operator U may be reduced when shipment items vary from shipment destination to shipment destination.

Second Exemplary Embodiment

In a second exemplary embodiment, components given the same reference signs as those in the first exemplary embodiment are identical to those in the first exemplary embodiment. With regard to components that correspond to the components described in the first exemplary embodiment, such components will be expressed by being given a suffix "A" to the reference sign.

In the first exemplary embodiment, the server device 10 performs control to cause the printer 30 to output a task instruction and a missing enclosure item in accordance with an error notification received from the reading device 20. In contrast, in the second exemplary embodiment, a reading device 20A performs control to cause the printer 30 to output a task instruction and a missing enclosure item. In this case, the controller 21 of the reading device 20A corresponds to a control device according to an exemplary embodiment of the present invention.

Figure 10:
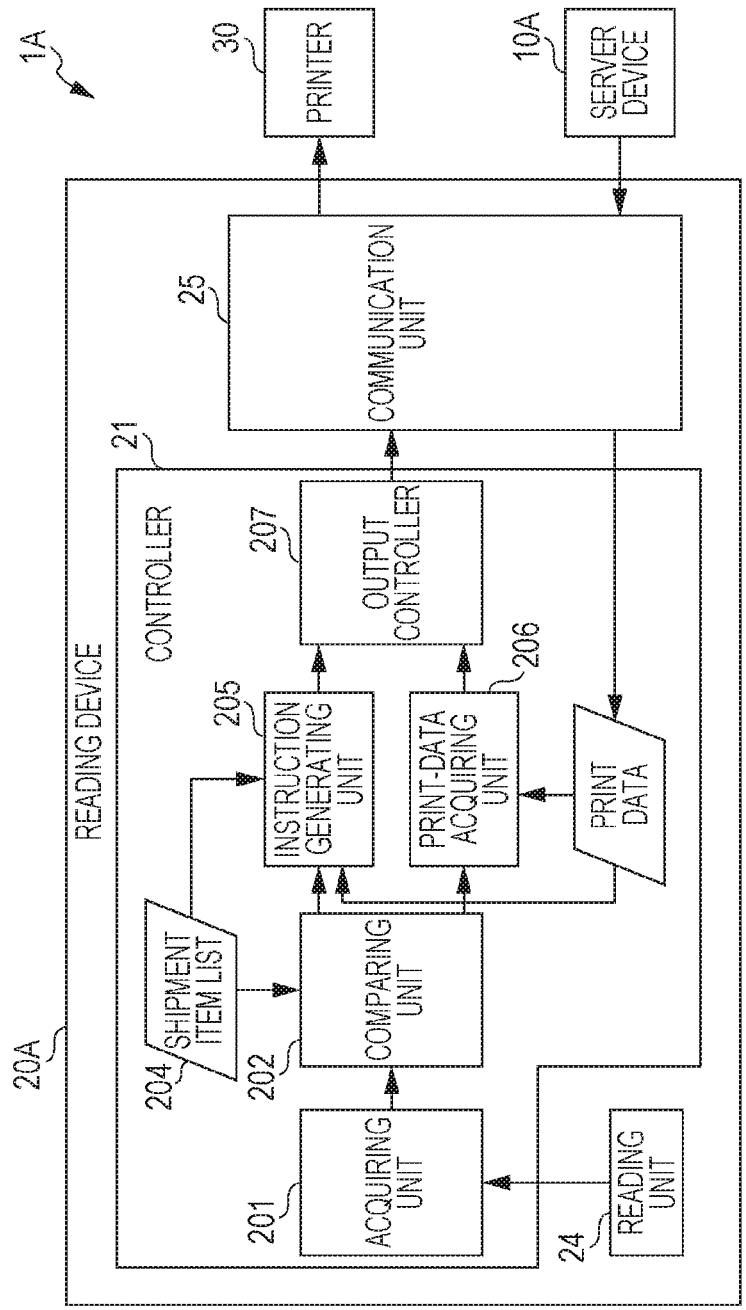
FIG. 10 illustrates a functional configuration of a task assistance system according to a second exemplary embodiment of the present invention.

FIG. 10 illustrates a functional configuration of a task assistance system 1A. As shown in FIG. 10, the controller 21 of the reading device 20A includes functions corresponding to the acquiring unit 201, the comparing unit 202, an instruction generating unit 205, a print-data acquiring unit 206, and an output controller 207.

Based on a comparison result obtained by the comparing unit 202, if enclosure items have not been completely collected, the instruction generating unit 205 generates a task instruction based on print data and the shipment item list 204. The instruction generating unit 205 communicates with a server device 10A via the communication unit 25 and acquires the print data therefrom.

Based on the comparison result obtained by the comparing unit 202, if enclosure items have not been completely collected, the print-data acquiring unit 206 acquires print data of a missing enclosure item by communicating with the server device 10A via the communication unit 25.

The output controller 207 generates print command data for printing the task instruction generated by the instruction generating unit 205 and the enclosure item expressed by the print data acquired by the print-data acquiring unit 206, and transmits the print command data to the printer 30 via the communication unit 25.

Figure 11:
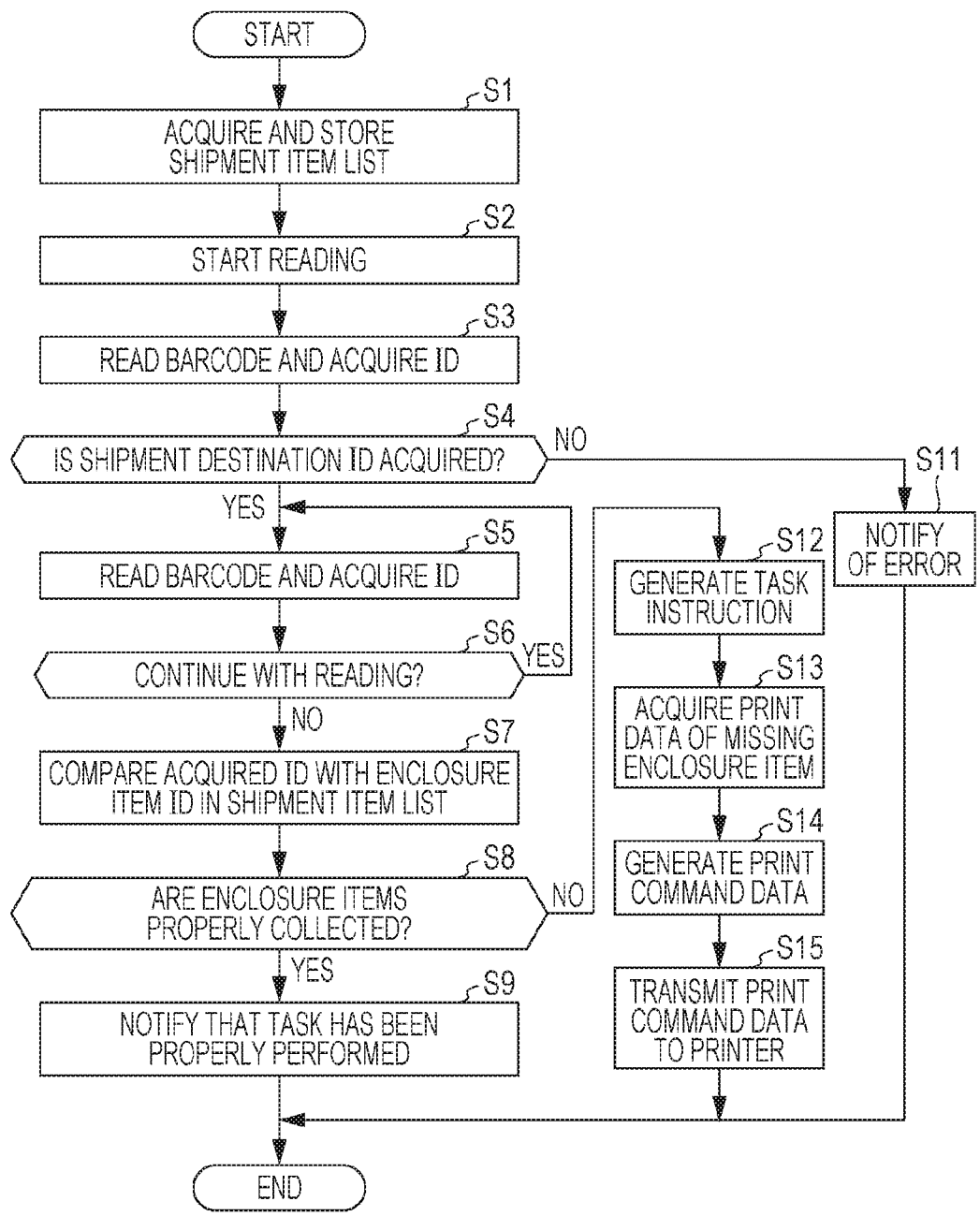
FIG. 11 is a flowchart illustrating a process performed by a reading device according to the second exemplary embodiment.

FIG. 11 is a flowchart illustrating a process performed by the reading device 20A. As shown in FIG. 11, this process differs from that in the first exemplary embodiment in a process performed when a determination result "NO" is obtained in step S8, that is, when enclosure items have not been properly collected.

When a determination result "NO" is obtained in step S8, the CPU 211 generates a task instruction in step S12. Subsequently, if there is a missing enclosure item, the CPU 211 acquires print data for printing this enclosure item in step S13. Then, the CPU 211 generates print command data for printing the generated task instruction and the enclosure item expressed by the acquired print data in step S14, and transmits the print command data to the printer 30 via the communication unit 25 in step S15.

The process from step S12 to step S15 may be identical to the process from step S22 to step S25 in the first exemplary embodiment.

The task assistance system 1A described above may use the function of the reading device 20A to assist in the task of the operator U, in addition to exhibiting the effects described in the first exemplary embodiment. Therefore, the server device 10A may at least have the function of transmitting the print data and the shipment item list to the reading device 20A.

Third Exemplary Embodiment

In a third exemplary embodiment, components given the same reference signs as those in the first exemplary embodiment are identical to those in the first exemplary embodiment. With regard to components that correspond to the components described in the first exemplary embodiment, such components will be expressed by being given a suffix "B" to the reference sign.

Figure 12:
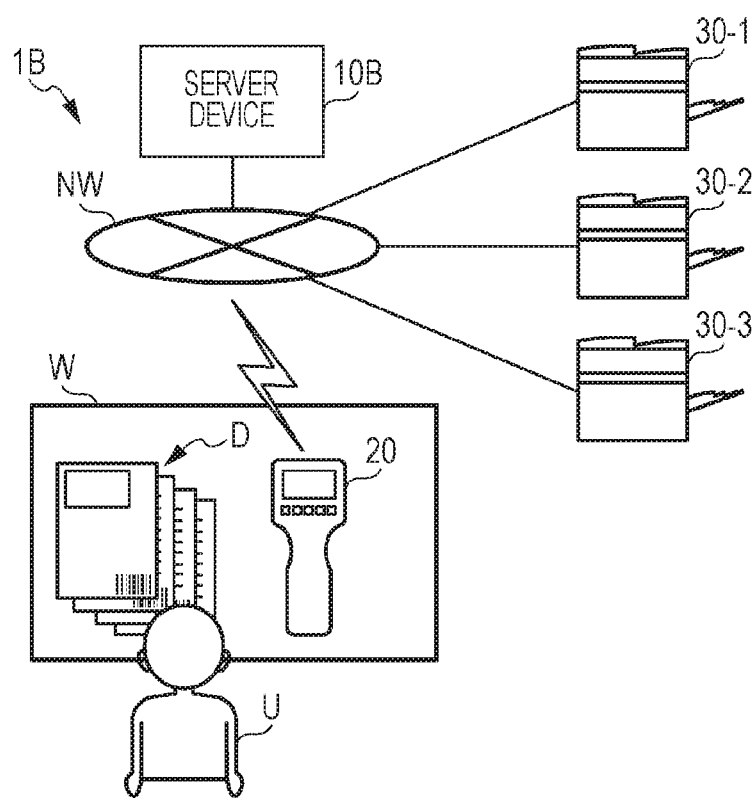
FIG. 12 illustrates the overall configuration of a task assistance system according to a third exemplary embodiment of the present invention.

FIG. 12 illustrates the overall configuration of a task assistance system 1B. The task assistance system 1B includes a server device 10B, a reading device 20, and multiple printers 30 (30-1, 30-2, and 30-3). The multiple printers 30-1, 30-2, and 30-3 are shared by, for example, multiple operators U and have different outputtable document conditions (referred to as "outputtable conditions" hereinafter). The outputtable conditions include printout-related conditions, which include the sizes of media, such as paper (e.g., A3 size, A4 size, and B5 size), the types of media (e.g., plain paper, thick paper, crimped postcards, and postcards with logos), and the colors used in printing (e.g., monochrome and full-color).

The number of printers 30 is not limited to three and may be two or four or more.

Figure 13:
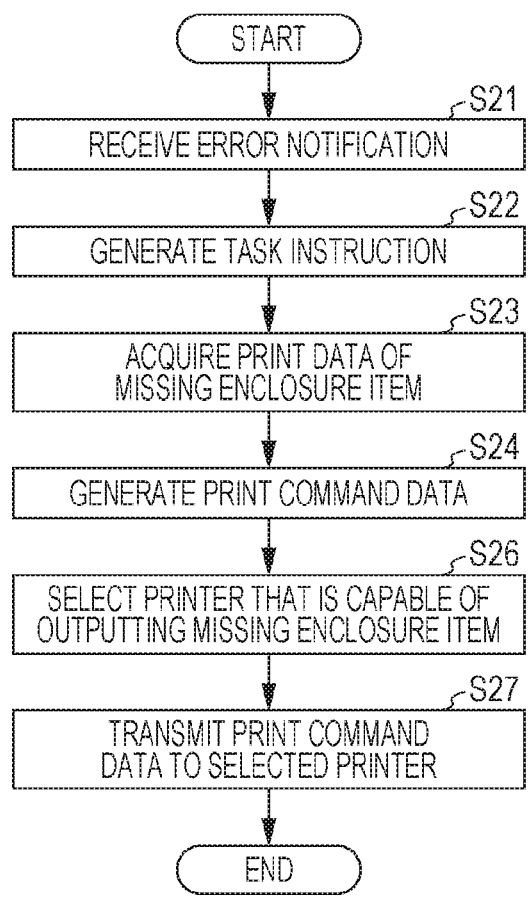
FIG. 13 is a flowchart illustrating a process performed by a server device according to the third exemplary embodiment of the present invention.

FIG. 13 is a flowchart illustrating a process performed by the server device 10B.

After performing the process from step S21 to step S24, if a missing enclosure item is to be printed, the CPU 111 of the server device 10B selects a printer 30 that is capable of outputting the enclosure item with predesignated conditions from among the multiple printers 30 in step S26. For example, with regard to the enclosure item, the size and the type of a medium to be used and the color to be used are often predesignated. The CPU 111 selects a printer 30 that is capable of outputting the enclosure item with the designated conditions therefor based on the outputtable conditions.

The server device 10B may determine the printable conditions by making inquiries to the printers 30 or may refer to information about the printable conditions of each printer 30 set in advance.

Then, in step S27, the CPU 111 transmits print command data to the printer 30 selected in step S26 via the communication unit 12.

The task assistance system 1B according to the third exemplary embodiment described above outputs shipment items printed with designated conditions, in addition to exhibiting the effects described in the first exemplary embodiment.

Fourth Exemplary Embodiment

The articles according to an exemplary embodiment of the present invention are not limited to shipment items. An exemplary embodiment of the present invention may be applied to a task for collecting articles other than shipment items. In a fourth exemplary embodiment, components given the same reference signs as those in the first exemplary embodiment are identical to those in the first exemplary embodiment. With regard to components that correspond to the components described in the first exemplary embodiment, such components will be expressed by being given a suffix "C" to the reference sign.

Figure 14:
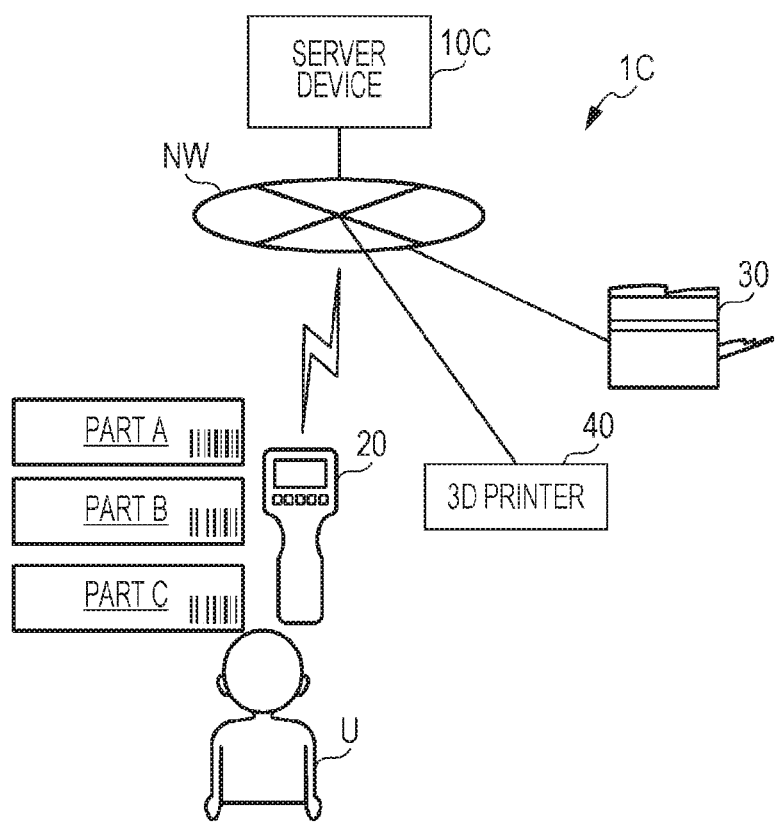
FIG. 14 illustrates the overall configuration of a task assistance system according to a fourth exemplary embodiment of the present invention.

FIG. 14 illustrates the overall configuration of a task assistance system 1C. The task assistance system 1C includes a server device 10C, a reading device 20, a printer 30, and a three-dimensional (3D) printer 40 as an example of an output unit according to an exemplary embodiment of the present invention. The task assistance system 1C assists in a task to be performed by the operator U for joining together parts, which are three-dimensional objects. The following description relates to a case where the operator U collects parts A, B, and C. The parts A, B, and C are each given a barcode indicating identification information of the part. When the operator U performs the task, the operator U makes the reading device 20 read the barcodes given to the parts A, B, and C.

The reading device 20 uses the same method described in the first exemplary embodiment to determine whether the parts have been properly collected. If the parts have not been properly collected, the reading device 20 transmits an error notification to the server device 10C. When the server device 10C receives the error notification, the server device 10C transmits print command data of a task instruction to the printer 30 and transmits output command data for outputting a missing part to the 3D printer 40. Based on the received output command data, the 3D printer 40 creates and outputs the missing part.

In the task assistance system 1C, if the operator U makes a mistake in the task for collecting the multiple parts, the task assistance system 1C makes the printer 30 print a task instruction describing the contents for collecting these parts and makes the 3D printer 40 output a missing part. Therefore, the operator U may quickly ascertain what has to be performed from the contents of the task instruction. Moreover, since the missing part is output from the 3D printer 40, the operator U does not have to go collect the missing part from a storage location.

The exemplary embodiments of the present invention may be applied to a system that assists in a task for collecting multiple documents for a purpose other than a shipment task, or that assists in a task for collecting multiple three-dimensional objects for a purpose other than joining together parts. The multiple articles according to an exemplary embodiment of the present invention are multiple articles that are to be ultimately grouped together.

MODIFICATIONS

An exemplary embodiment of the present invention may be implemented differently from the exemplary embodiments described above. Furthermore, the following modifications may be combined.

The configurations of the task assistance systems described in the first to fourth exemplary embodiments may be combined. For example, the task assistance system according to any one of the first to third exemplary embodiments may be combined with the task assistance system according to the fourth exemplary embodiment. In that case, if there is a missing document in the enclosure items, the server device may cause the printer 30 to output the document. If there is a missing three-dimensional object, the server device may cause the 3D printer 40 to output the three-dimensional object.

In the first exemplary embodiment described above, the server device 10 determines whether the combination of shipment items and the arranged order thereof are correct. Alternatively, the server device 10 may determine whether the combination of enclosure items is correct and may be configured not to determine the arranged order thereof. In this case, condition III described in the first exemplary embodiment is omitted.

The reading device 20 may compare a shipment item ID acquired in step S3 in the shipment item list 204 with the enclosure item IDs corresponding to the shipment item ID every time an ID is acquired in step S5. In this case, the reading device 20 determines that enclosure items have been properly collected when all enclosure item IDs designated in the shipment item list 204 are acquired in the registered order in the shipment item list 204.

One of or some of the functions realized by the reading device 20 in the first exemplary embodiment may be realized by the server device 10. For example, the function corresponding to the comparing unit 202 may be realized in the controller 11 of the server device 10. In this case, the CPU 211 of the reading device 20 transmits an ID acquired from a barcode to the server device 10 via the communication unit 25. The CPU 111 of the server device 10 makes the RAM 113 store the shipment item list 132 and compares the received ID with the enclosure item IDs in the shipment item list 132. Then, based on this comparison result, the CPU 111 causes the printer 30 to print a task instruction and a missing enclosure item.

Specifically, the control device according to an exemplary embodiment of the present invention may be realized by either one of the reading device and the server device or may be realized by another device.

Although a task instruction is output by printing in the task assistance system according to each of the above exemplary embodiments, the output method is not limited to printing. For example, the CPU 211 of the reading device 20 may output the contents of the task for collecting the enclosure items by displaying the contents on the display unit 23 or by outputting the contents using sound.

A part of the configuration or the operation described in each of the above exemplary embodiments may be omitted. Furthermore, the contents of task instructions described with reference to FIGS. 9A to 9D are merely examples. A task instruction may be a document that instructs the contents of a task and does not have to contain, for example, thumbnail images.

In each of the above exemplary embodiments, a shipment item ID is acquired from a barcode. Alternatively, a shipment item ID may be acquired from an encoded image other than a barcode, such as a two-dimensional code or yellow dots, or may be acquired from an image other than an encoded image.

The functions achieved by the server device and the reading device according to each of the above exemplary embodiments may be realized by a combination of multiple programs or may be realized by coordination between multiple hardware resources. In the case where the functions of the server device and the reading device are realized by using a program, this program may be provided by being stored in a computer-readable storage medium, which includes a magnetic storage medium, such as a magnetic tape or a magnetic disk (e.g., a hard disk drive (HDD) or a flexible disk (FD)); an optical storage medium, such as an optical disk; a magneto-optical storage medium; and a semiconductor memory, or may be distributed via a network. Furthermore, an exemplary embodiment of the present invention may be regarded as a task assistance method.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A control device comprising:
a computer processor configured to:
acquire identification information read by an electronic reader from one or more first articles as first information, the one or more first articles including an identifier provided on a surface of the one or more first articles, and the identifier being readable by the electronic reader;
compare the first information with a second identification information, the second information including identification information of one or more second articles listed in a predetermined list stored in a memory; and
automatically control a printer to print a task comprising a thumbnail image corresponding to a discrepancy between the first information and the second information based on a result of the comparison between the first information and the second information, the thumbnail image identifying an article, among the one or more first articles and the one or more second articles, that causes the discrepancy between the first information and the second information,
wherein each of the one or more first articles is one of a printed document or a printed three-dimensional object,
wherein each of the one or more second articles is a to-be-printed printed document or a to-be-printed three-dimensional object,
wherein the discrepancy between the first information and the second information comprises a discrepancy between the printed document in the acquired first information and the to-be-printed printed document in the predetermined list or a discrepancy between the printed three-dimensional object in the acquired first information and the to-be-printed three-dimensional object listed in the predetermined list, and
wherein the printer automatically printing the task comprises:
printing the thumbnail image depicting at least one of the printed document, the three-dimensional object, the to-be-printed document or the to-be-printed three-dimensional object, and
printing additional information indicating an action to be performed to obviate the discrepancy between the first information and the second information.

2. The control device according to claim 1,
wherein, if the first information does not include identification information corresponding to the to-be-printed document listed in the predetermined list, the computer processor controls the printer to print the to-be-printed document.

3. The control device according to claim 2,
wherein, if the first information does not include identification information corresponding to the to-be-printed document listed in the predetermined list or if the first information includes identification information of another document not belonging to the one or more second articles listed in the predetermined list, the computer processor controls the printer to print the task containing an image of the to-be-printed document or the another document.

4. The control device according to claim 2,
wherein the printer includes a plurality of printers with different outputtable document conditions, and
wherein, if the first information does not include identification information corresponding to the to-be-printed document, the computer processor selects a printer that is capable of printing the to-be-printed document with a predesignated condition from among the plurality of printers.

5. The control device according to claim 1,
wherein the one or more first articles is a three-dimensional object, and
wherein, if the first information does not include identification information corresponding three-dimensional object, the computer processor controls a three-dimensional printer to print the three-dimensional object.

6. A reading device comprising:
a memory that stores article identification information about each of a plurality of first articles listed in a predetermined list as first identification information;
an electronic reader that reads an article identification information from one or more second articles as second identification information, the one or more second articles including an identifier provided on a surface of the one or more second articles, and the identifier being readable by the electronic reader;
a computer processor configured to:
acquire the second identification information read by the electronic reader;
compare the second identification information with the first identification information; and
automatically control a printer to print a task comprising a thumbnail image corresponding to a discrepancy between the first identification information and the second identification information based on a result of comparing the first identification information and the second identification information, the thumbnail image identifying an article, among the plurality of first articles and the one or more second articles, that causes the discrepancy between the first identification information and the second identification information,
wherein each of the one or more first articles is one of a to-be-printed printed document or a to-be-printed three-dimensional object,
wherein each of the one or more second articles is a printed document or a printed three-dimensional object,
wherein the discrepancy between the first identification information and the second identification information comprises a discrepancy between the to-be-printed document in the first identification information and the printed document in the acquired second identification information or a discrepancy between the to-be-printed three-dimensional object in the first identification information and the printed three-dimensional object listed in the acquired second identification information, and
wherein the printer automatically printing the task comprises:
printing the thumbnail image depicting at least one of the printed document, the three-dimensional object, the to-be-printed document or the to-be-printed three-dimensional object, and
printing additional information indicating an action to be performed to obviate the discrepancy between the first identification information and the second identification information.

7. The reading device according to claim 6,
wherein the plurality of first articles are physical articles to be shipped to a predesignated shipment destination,
wherein the memory stores the first identification information corresponding to each of a plurality of shipment destinations,
wherein, when any one of the plurality of shipment destinations is designated, the computer processor uses the first identification information corresponding to the shipment destination for the comparison.

8. A task assistance system comprising:
a memory that stores article identification information about each of a plurality of first articles listed in a predetermined list as first identification information;
an electronic reader that reads an article identification information from one or more second articles as second identification information, the one or more second articles including an identifier provided on a surface of the one or more second articles, and the identifier being readable by the electronic reader;
a computer processor configured to:
acquire the second identification information read by the electronic reader;
compare the second identification information with the first identification information; and
automatically control a printer to print a task comprising a thumbnail image corresponding to a discrepancy between the first identification information and the second identification information based on a result of comparing the first identification information and the second identification information, the thumbnail image identifying an article, among the plurality of first articles and the one or more second articles, that causes the discrepancy between the first identification information and the second identification information,
wherein each of the one or more first articles is one of a to-be-printed printed document or a to-be-printed three-dimensional object,
wherein each of the one or more second articles is a printed document or a printed three-dimensional object,
wherein the discrepancy between the first identification information and the second identification information comprises a discrepancy between the to-be-printed document in the first identification information and the printed document in the acquired second identification information or a discrepancy between the to-be-printed three-dimensional object in the first identification information and the printed three-dimensional object listed in the acquired second identification information, and
wherein the printer automatically printing the task comprises:
printing the thumbnail image depicting at least one of the printed document, the three-dimensional object, the to-be-printed document or the to-be-printed three-dimensional object, and
printing additional information indicating an action to be performed to obviate the discrepancy between the first identification information and the second identification information.

9. A non-transitory computer readable medium storing a program, which if executed, causes a computer to execute a control process, the control process comprising:
acquiring identification information read by an electronic reader from one or more first articles as first information, the one or more first articles including an identifier provided on a surface of the one or more first articles, and the identifier being readable by the electronic reader;
comparing the first information with a second identification information, the second information including identification information of one or more second articles listed in a predetermined list stored in a memory; and
automatically controlling a printer to print a task comprising a thumbnail image corresponding to a discrepancy between the first information and the second information based on a result of a comparison between the first information and the second information, the thumbnail image identifying an article, among the one or more first articles and the one or more second articles, that causes the discrepancy between the first information and the second information,
wherein each of the one or more first articles is one of a printed document or a printed three-dimensional object,
wherein each of the one or more second articles is a to-be-printed printed document or a to-be-printed three-dimensional object,
wherein the discrepancy between the first information and the second information comprises a discrepancy between the printed document in the acquired first information and the to-be-printed printed document in the predetermined list or a discrepancy between the printed three-dimensional object in the acquired first information and the to-be-printed three-dimensional object listed in the predetermined list, and
wherein the printer automatically printing the task comprises:
printing the thumbnail image depicting at least one of the printed document, the three-dimensional object, the to-be-printed document or the to-be-printed three-dimensional object, and
printing additional information indicating an action to be performed to obviate the discrepancy between the first information and the second information.

10. A non-transitory computer readable medium storing a program, which if executed, causes a computer to execute a control process, the control process comprising:
storing article identification information about each of a plurality of first articles listed in a predetermined list as first identification information;
reading, by an electronic reader, an article identification information from one or more second articles as second identification information, the one or more second articles including an identifier provided on a surface of the one or more second articles, and the identifier being readable by the electronic reader;
acquiring the second identification information read by the electronic reader;
comparing the acquired second identification information with the stored first identification information; and
automatically controlling a printer to print a task comprising a thumbnail image corresponding to a discrepancy between the first identification information and the second identification information based on a result of comparing the first identification information and the second identification information, the thumbnail image identifying an article, among the plurality of first articles and the one or more second articles, that causes the discrepancy between the first identification information and the second identification information,
wherein each of the one or more first articles is one of a to-be-printed printed document or a to-be-printed three-dimensional object,
wherein each of the one or more second articles is a printed document or a printed three-dimensional object,
wherein the discrepancy between the first identification information and the second identification information comprises a discrepancy between the to-be-printed document in the first identification information and the printed document in the acquired second identification information or a discrepancy between the to-be-printed three-dimensional object in the first identification information and the printed three-dimensional object listed in the acquired second identification information, and wherein the printer automatically printing the task comprises:

printing the thumbnail image depicting at least one of the printed document, the three-dimensional object, the to-be-printed document or the to-be-printed three-dimensional object, and printing additional information indicating an action to be performed to obviate the discrepancy between the first identification information and the second identification information.

11. A control method comprising:

acquiring identification information read by an electronic reader from one or more first articles as first information, the one or more first articles including an identifier provided on a surface of the one or more first articles, and the identifier being readable by the electronic reader;

comparing the first information with a second identification information, the second information including identification information of one or more second articles listed in a predetermined list stored in a memory; and automatically controlling the printer to print a task comprising a thumbnail image corresponding to a discrepancy between the first information and the second information based on a result of a comparison between the first information and the second information, the thumbnail image identifying an article, among the one or more first articles and the one or more second articles, that causes the discrepancy between the first information and the second information, wherein each of the one or more first articles is one of a printed document or a printed three-dimensional object, wherein each of the one or more second articles is a to-be-printed printed document or a to-be-printed three-dimensional object, wherein the discrepancy between the first information and the second information comprises a discrepancy between the printed document in the acquired first information and the to-be-printed printed document in the predetermined list or a discrepancy between the printed three-dimensional object in the acquired first information and the to-be-printed three-dimensional object listed in the predetermined list, and wherein the printer automatically printing the task comprises:

printing the thumbnail image depicting at least one of the printed document, the three-dimensional object, the to-be-printed document or the to-be-printed three-dimensional object, and printing additional information indicating an action to be performed to obviate the discrepancy between the first information and the second information.

12. The control device according to claim 1, wherein the task comprises guide information with a visual illustration using the thumbnail image notifying how to obviate the discrepancy between the first information and the second information.

13. The task assistance system of claim 8, wherein the task comprises guide information with a visual illustration using the thumbnail image notifying how to obviate the discrepancy between the first identification information and the second identification information.

14. The non-transitory computer readable medium of claim 9, wherein the task comprises guide information with a visual illustration using the thumbnail image notifying how to obviate the discrepancy between the first information and the second information.

15. The non-transitory computer readable medium of claim 10, wherein the task comprises guide information with a visual illustration using the thumbnail image notifying how to obviate the discrepancy between the first identification information and the second identification information.

16. The control method of claim 11, wherein the task comprises guide information with a visual illustration using the thumbnail image notifying how to obviate the discrepancy between the first information and the second information.

17. The control device according to claim 1, wherein the additional information is guide information with a visual illustration using the thumbnail image to add the to-be-printed document or the to-be-printed three-dimensional object that is causing the discrepancy between the first information and the second information.

18. The control device according to claim 1, wherein the additional information is guide information with a visual illustration using the thumbnail image to remove the printed document or the printed three-dimensional object that is causing the discrepancy between the first information and the second information.

19. The control device according to claim 1, wherein the additional information is guide information with a visual illustration using the thumbnail image to rearrange the order of the to-be-printed document or the to-be-printed three-dimensional object that is causing the discrepancy between the first information and the second information.

20. The control device according to claim 1, wherein the additional information is guide information with a visual illustration using the thumbnail image to replace the printed document with the to-be-printed document or replace the printed three-dimensional object with the to-be-printed three-dimensional object that is causing the discrepancy between the first information and the second information.

* * * * *